United States Patent
Kobayashi et al.

(10) Patent No.: US 8,018,836 B2
(45) Date of Patent: Sep. 13, 2011

(54) ROUTE CONFIRMATION METHOD AND DEVICE

(75) Inventors: Ryu Kobayashi, Kawasaki (JP); Gaku Tanabe, Kawasaki (JP); Tomonori Gotoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 74 days.

(21) Appl. No.: 12/401,731

(22) Filed: Mar. 11, 2009

(65) Prior Publication Data

US 2009/0190481 A1    Jul. 30, 2009

Related U.S. Application Data

(63) Continuation of application No. PCT/JP2006/318397, filed on Sep. 15, 2006.

(51) Int. Cl.
*H04L 1/00* (2006.01)
(52) U.S. Cl. .................. 370/217; 370/221; 370/225
(58) Field of Classification Search .......... 370/216–228, 370/389, 390, 428, 432, 474, 492, 501
See application file for complete search history.

(56) References Cited

U.S. PATENT DOCUMENTS

| | | | |
|---|---|---|---|
| 7,426,573 B2* | 9/2008 | Wells et al. | 709/238 |
| 2001/0036153 A1* | 11/2001 | Sasaki et al. | 370/218 |
| 2003/0117950 A1* | 6/2003 | Huang | 370/220 |
| 2005/0243712 A1* | 11/2005 | MacKinnon et al. | 370/216 |
| 2006/0198695 A1* | 9/2006 | Kano et al. | 403/408.1 |
| 2007/0174483 A1* | 7/2007 | Raj et al. | 709/238 |

FOREIGN PATENT DOCUMENTS

| | | |
|---|---|---|
| JP | 63-3522 | 1/1988 |
| JP | 5-327674 | 12/1993 |
| JP | 10-261981 | 9/1998 |
| JP | 2006-186633 | 7/2006 |

OTHER PUBLICATIONS

International Search Report dated Oct. 10, 2006, from the corresponding International Application.

* cited by examiner

*Primary Examiner* — Ricky Ngo
*Assistant Examiner* — Wei-Po Kao
(74) *Attorney, Agent, or Firm* — Katten Muchin Rosenman LLP

(57) ABSTRACT

In order to preliminarily confirming whether or not a protection route to be switched over can be safely switched over during a working route being used in a unicast or multicast mode. a notification of communication confirmation/quality confirmation or multicast communication confirmation is received from a manager device is received. When the received unicast or multicast packet does not include an confirmation identifier instructed by the notification while the received unicast or multicast packet includes a destination network or multicast address instructed by the notification, the received packet is mirrored and the confirmation identifier is set in a predetermined area within a header of the packet to be transferred to a preselected protection route. When the received packet includes the destination network or multicast address and the confirmation identifier instructed by the notification, the manager device is notified of a result of the communication confirmation/quality confirmation and the packet is transferred to the protection route.

20 Claims, 21 Drawing Sheets

FIG.2A

| ROUTING TABLE | | | |
|---|---|---|---|
| DESTINATION NETWORK | COST | INTERFACE | ... |
| NW#1 | 10 | IF#1 | ... |
| NW #2 | 10 | IF#2 | ... |
| NW #3 | 10 | IF#3 | ... |
| NW #4 | 10 | IF#n | ... |
| NW #5 | 10 | IF#n | ... |
| NW #6 | 10 | IF#n | ... |

FIG.2B

| SECONDARY ROUTING TABLE | | | |
|---|---|---|---|
| DESTNATION NETWORK | COST | INTERFACE | ... |
| NW #1 | 100 | IF#2 | ... |
| NW #1 | 120 | IF#3 | ... |
| NW #2 | 200 | IF#1 | ... |
| NW #2 | 150 | IF#3 | ... |
| NW #2 | 500 | IF#n | ... |
| NW #3 | 100 | IF#1 | ... |

| | | | | | | | |
|---|---|---|---|---|---|---|---|
| | TOS FIELD BIT PATTERN (RFC2474) |
| Bit0 | Bit1 | Bit2 | Bit3 | Bit4 | Bit5 | Bit6 | Bit7 |
| colspan="6" | DSCP (Differentiated Service Code Point) | colspan="2" | UNUSED |

ROUTE CONFIRMATION METHOD AND DEVICE

CROSS-REFERENCE TO RELATED APPLICATION

This application is a continuation of International Application PCT/JP2006/318397 filed on Sep. 15, 2006, the contents of which are herein wholly incorporated by reference.

BACKGROUND

1. Field

The present invention relates to a route confirmation method and device for preliminarily confirming the state of a protection route selected.

2. Description of the Related Art

An example of a common router composing an IP network is shown in FIGS. 20 and 21.

FIG. 20 shows a functional block diagram of such a router as known in the art, in which this router is composed of interfaces IF#1-IF#n each serving as a gateway of subordinate networks NW#1-NW#n, a transmitter/receiver portion 2 for transferring data to/from those interfaces, a routing cache 3 that is a route memory area for routing packets to known routes or paths without intervention of softwares, and a routing table 4 for retrieving transfer destinations of packets.

An operation of this router is shown in FIG. 21. Packets inputted from the interfaces IF#1-IF#n are received by the transmitter/receiver portion 2 (steps S41, S42). When the destination address of a packet received has been already registered in the routing cache 3 (step S43), the packet is outputted to proper interfaces IF#1-IF#n through the transmitter/receiver portion 2 without intervention of softwares (step S45).

On the other hand, when a packet received has a destination address unregistered in the routing cache 3, a target route (interface) is retrieved from the routing table 4 with a software and the packet is outputted through the transmitter/receiver portion 2 (steps S44, S45).

An IP network provided with a plurality of such routers is usually designed to keep a communication between users by switching over to an operation in a protection route at the occurrence of a fault in a working route.

In this connection, there has been proposed a line switching system provided with a function of determining if a communication with an opposed side through a connection line is enabled and switchable, wherein a measured delay time of a connecting circuit is provided to a timer; the timer is given a switching signal based on a logical AND of a switching signal and a switchable signal and delays the switching signal as needed to be sent to a switching control device (See e.g. Japanese Patent Application Publication No. 63-3522).

Also, there has been proposed a line switching control method wherein a management table formed based on configuration information such as a transmission device and a line configuring a transmission network and on collected fault information such as input interruption and error rate deterioration is provided in a monitoring center; when an operator of the center makes switching instructions, it is determined whether or not a line disconnection occurs by referring to the management table, in which in the absence of line disconnection a switching control signal according to the switching instructions is provided while in the presence of line disconnection, the operator is notified to that effect, so that no switching control signal is provided (See e.g. Japanese Patent Application Publication No. 10-261981).

While it is recently generalized to provide a redundant structure across a plurality of networks as an IP network is speeded up and larger scaled, the number of devices composing the network is minimized for the cost reduction. Under such a circumstance, the following problems are mentioned:

<Problem 1>

Since it is not possible to determine whether or not a protection route can be communicated while a working route is being used, a switchover from the working route to the protection route in a state where a fault has occurred in the protection route would cause a disconnection state;

<Problem 2>

Since it is not possible to determine whether or not a data communication quality of a protection route is guaranteed while a working route is being used, a switchover from the working route to the protection route in a state where the communication quality of the protection route has eminently decreased for some reason would cause an eminent decrease of the communication quality in comparison with the state before the switchover;

<Problem 3>

Since it is not possible to determine whether or not a multicast stream can be received in a protection route while a working route is being used, a switchover from the working route to the protection route in a state where a fault has occurred or a multicast stream communication setting is not arranged in the protection route would disable the multicast stream to be received.

SUMMARY

It is accordingly an object of the present invention to provide a method and device for preliminarily confirming whether or not a protection route to be switched over can be safely switched over while a working route is being used in a unicast or multicast mode.

In order to achieve the above-mentioned object, a route confirmation method (or device) comprising: a first step of (or means) receiving a notification of communication confirmation or quality confirmation from a manager device, a second step of (or means) mirroring a received unicast packet and setting a confirmation identifier in a predetermined area within a header of the packet to be transferred to a preselected protection route when the received unicast packet does not include the confirmation identifier instructed by the notification while the received unicast packet includes a destination network instructed by the notification, and a third step of (or means) notifying the manager device of a result of the communication confirmation or quality confirmation and transferring the packet to the protection route when the received unicast packet includes the destination network and the confirmation identifier.

Namely, when a notification of communication confirmation or quality confirmation is received from a manager device, a destination network and a confirmation identifier (ID) instructed by the notification are stored in a memory area. Then, it is determined whether or not a received packet includes the destination network and the confirmation identifier, wherein when it includes the destination network but does not include the confirmation identifier, the packet is mirrored, set with the confirmation identifier and transferred to a preset protection route. When it includes both of them, the result of the communication confirmation or quality confirmation is notified to the manager device and the packet is transferred to the protection route.

With a repetition of this operation, the communication confirmation or quality confirmation for the protection route is realized.

In the above case, it is possible that a threshold value of a line quality is preliminarily received, and when the quality of the packet falls below the threshold value upon receiving the packet, an alarm is notified to the manager device.

Also, a route confirmation method (or device) comprises a route confirmation method comprising: a first step of (or means) receiving a notification of multicast communication confirmation from a manager device, a second step of (or means) mirroring a received multicast packet and setting a confirmation identifier in a predetermined area within a header of the packet to be transferred to a preselected protection route when the received multicast packet does not include the confirmation identifier instructed by the notification while the received multicast packet includes a multicast address instructed by the notification, and a third step of (or means) notifying the manager device of a result of the multicast communication confirmation and transferring the packet to the protection route when the received multicast packet includes the multicast address and the confirmation identifier.

This enables the communication confirmation of the protection route which should transmit a multicast stream to be performed and notified to the manager device even while the working route is being used in a multicast mode.

In the above case, upon detecting a fault of the protection route, a failure of the communication confirmation may be notified to the manager device.

It is optional for the above protection route that all interfaces already registered in a prepared secondary routing table are selected, an interface for a route with the top priority among interfaces registered in a prepared secondary routing table is selected or all interfaces other than interfaces having received the packet among interfaces linked up are selected.

As noted above, in an IP network having a redundant route, in either of unicast mode or multicast mode, even after switchover to an operation for a protection route at an occurrence of a fault in a working route, a communication quality similar to the state before the switchover is guaranteed without causing a disconnection state. This enables a user using such a network to enjoy services as per normal without any influences of the fault.

Also, the communication/quality confirmation may be periodically performed without man power, whereby it becomes possible to reduce the frequency of periodical maintenances by a maintenance person and maintenance costs for the network.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 2A is a chart showing one example of a routing table and FIG. 2B is a chart showing one example of a secondary routing table used for the router in FIG. 1;

FIG. 4 is a chart showing a field bit pattern of TOS (Type Of Service) used in the embodiment;

DESCRIPTION OF THE EMBODIMENTS

Unicast Mode

Figure 1:
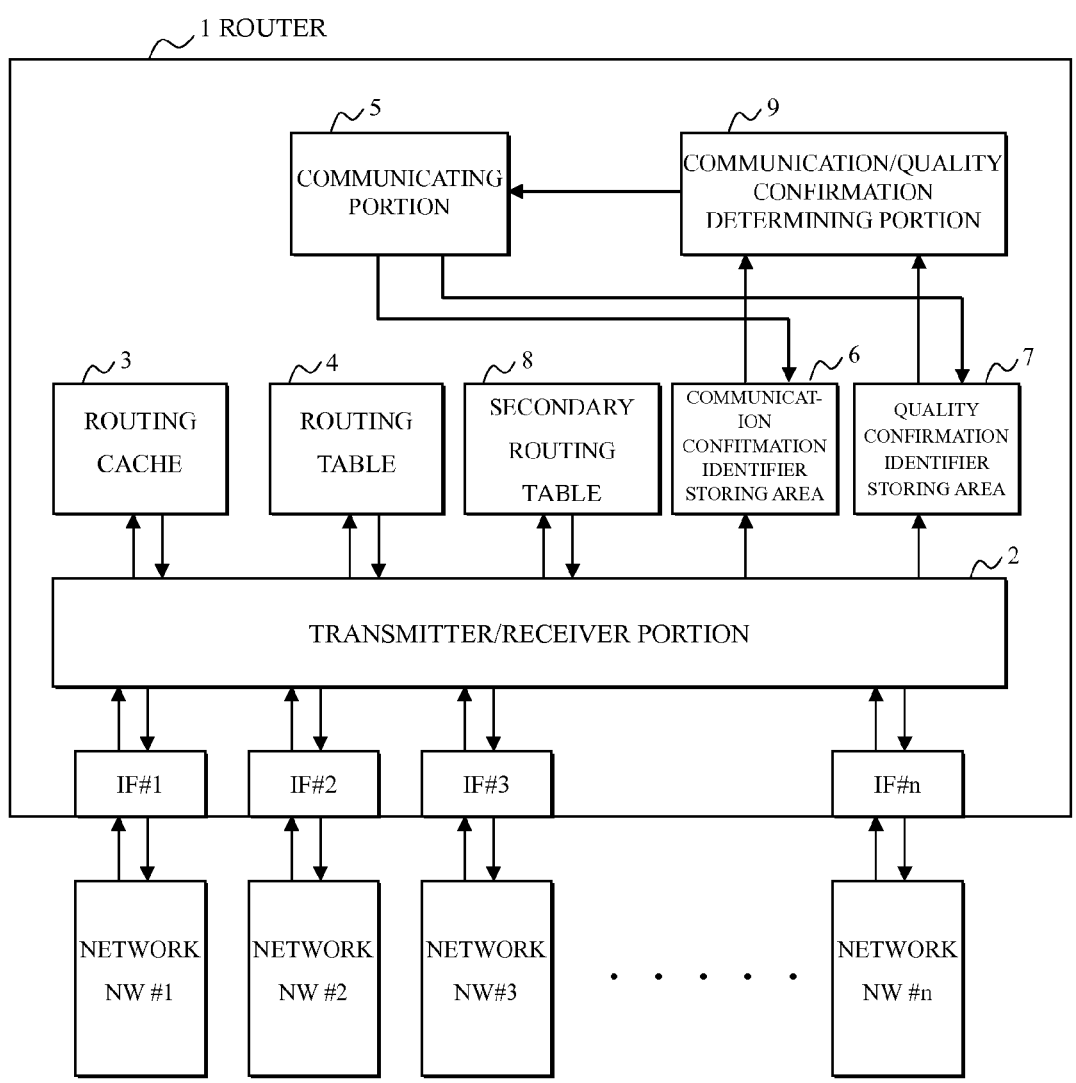
FIG. 1 is a block diagram showing a structural example of a router used in an embodiment of a route confirmation method and device.
Figure 20:
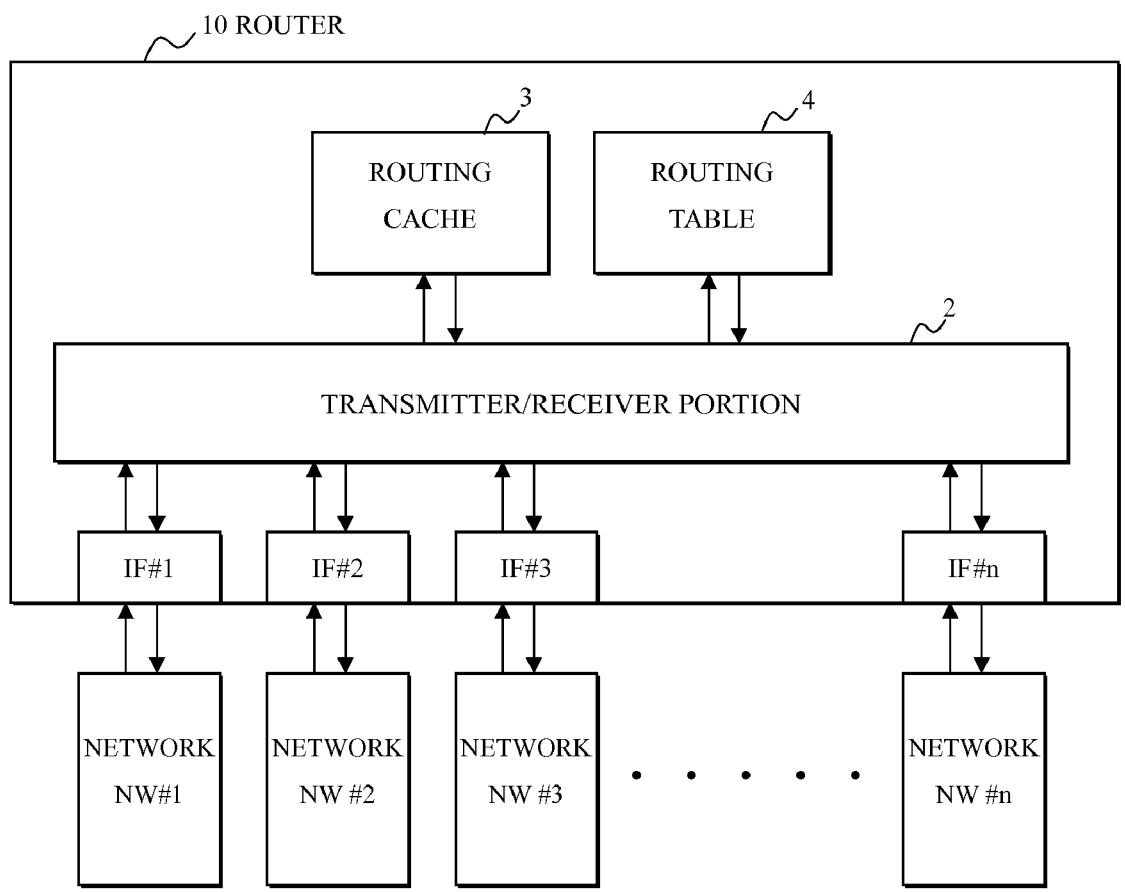
FIG. 20 is a flow chart showing a structural example of a conventional router.
Figure 21:
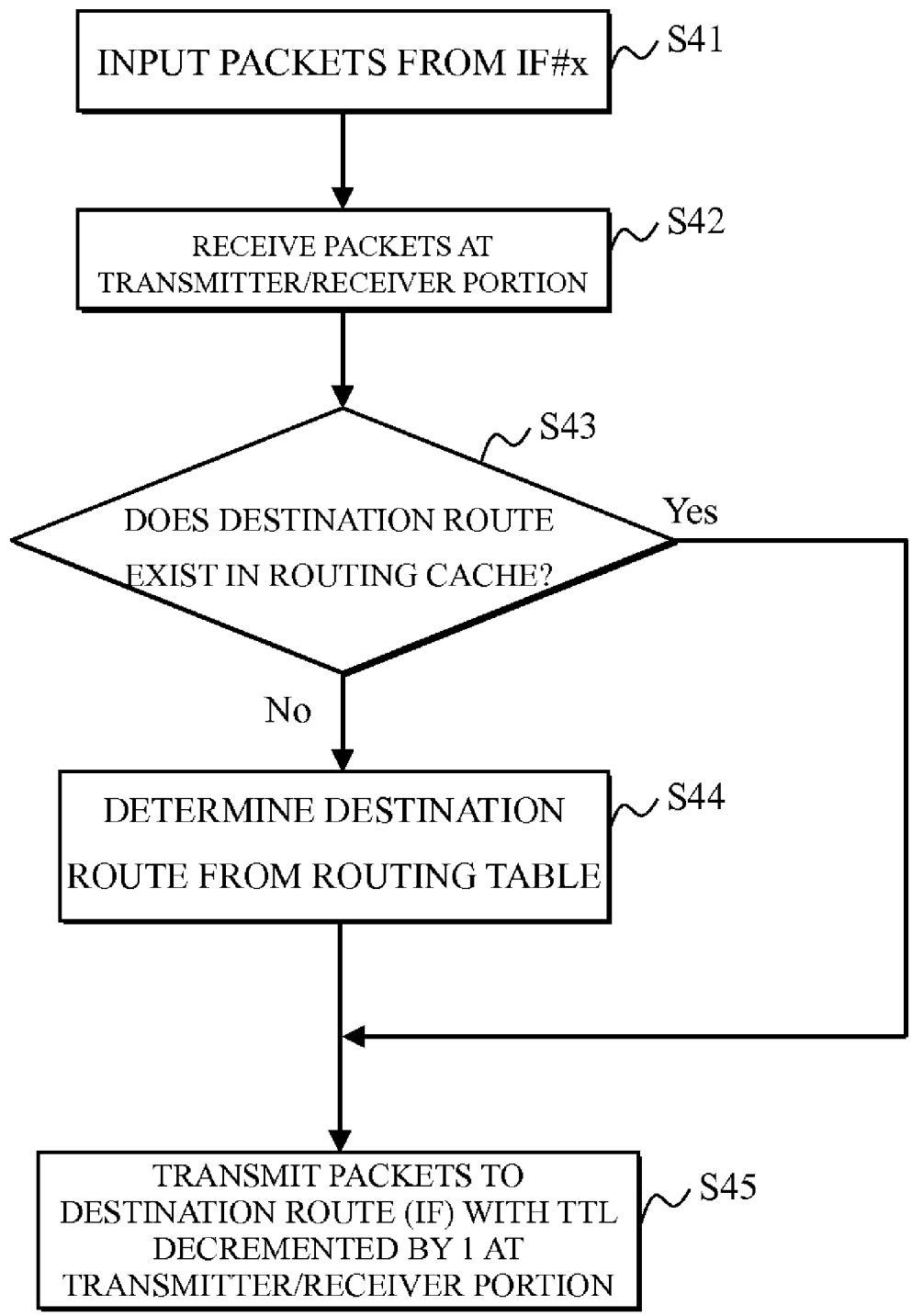
FIG. 21 is a flow chart showing an operational example of a conventional router.

FIG. 1 shows a functional block diagram of a router used for the route confirmation method and device. This router 1 represents all routers shown and comprises, in addition to the conventional router shown in FIG. 20, a communicating portion 5 performing communications with a manager device (see FIG. 5), a communication confirmation identifier memory area 6 that is an area storing a communication confirmation identifier notified from the manager device, a quality confirmation identifier memory area 7 that is an area storing a quality confirmation identifier, a secondary routing table 8 having previously registered therein interfaces with respect to networks unregistered in the conventional routing table 4 according to cost settings etc. and a communication/quality confirmation determining portion 9 determining or judging communicability/quality of a received communication/quality confirming packet and performing a notification request to the communicating portion 5.

FIG. 2A shows one example of the routing table 4, and FIG. 2B shows one example of the secondary routing table 8 as described below:

(1) Routing Table 4

This is a table for managing destination information of a packet as with a conventional routing table and has registered therein interfaces for outputting packets to a destination network;

(2) Secondary Routing Table 8

While the above noted routing table 4 has registered therein optimum routes according to cost etc., this secondary routing table 8 has preliminarily registered therein routes normally neglected and unregistered in the routing table 4, whereby a protection route is selected. Upon selecting the protection route, there are a mode of outputting packets to all of output interfaces with respect to destination networks registered in the secondary routing table 8, and a mode of outputting packets to interfaces of optimum routes with low costs, both being selected according to the setting. Also, it is a restriction matter that if the selected interfaces are the same as interfaces having received packets, those packets are to be discarded as causing a packet loop.

Figure 3:
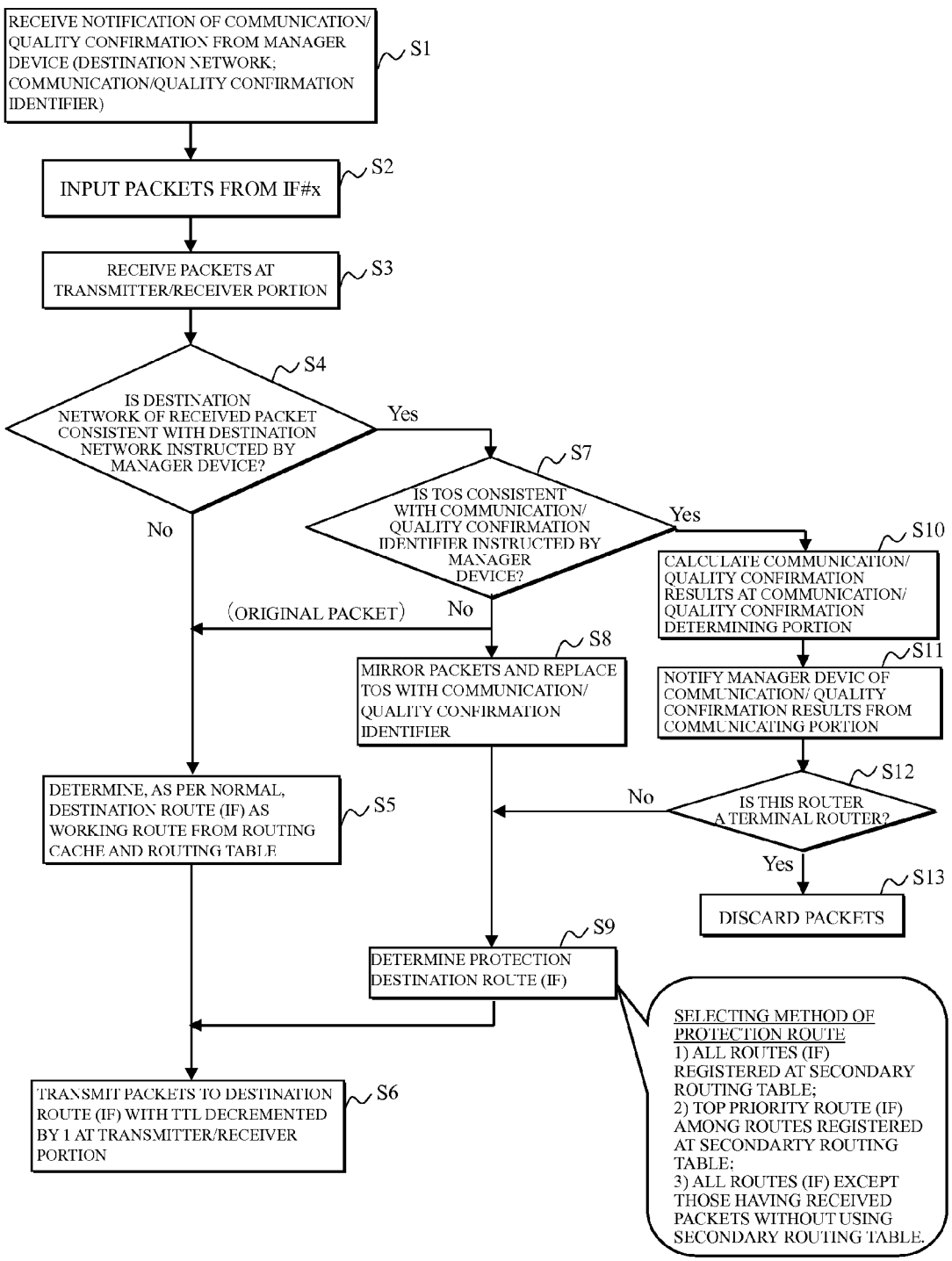
FIG. 3 is a flow chart of a unicast operation of the router in FIG. 1.

An operation flow chart of the router 1 is shown in FIG. 3, which will be referred to also in the operation sequence as described later.

When the manager device provides a notification of a communication/quality confirmation to each of the routers 1 thereunder (step S1), each router 1 receives a destination network and a communication/quality confirmation identifier (as well as a threshold value as needed) and stores them in the memory areas 6 and 7 (step S1).

In the router during the communication/quality confirmation, when packets inputted from the interfaces IF#1-IF#n are received by the transmitter/receiver portion 2 (steps S2, S3), it is determined whether or not the destination network of the packet is a network instructed by the manager device (step S4). If the result shows that the destination network instructed by the manager device is not included in the packet, the usual routing operation is performed with the routing cache 3 and the routing table 4 (steps S5, S6).

If it is consistent with the destination network instructed by the manager device, it is determined whether or not TOS (Type Of Service: see FIG. 4) of the packet is consistent with a communication/quality confirmation identifier instructed by the manager device (step S7). If the result shows that both are mutually inconsistent, the router 1 mirrors or copies the packet, properly replaces the value of TOS with a communication/quality confirmation identifier having been previously stored in the memory areas 6 and 7 (step S8), selects a protection route (step S9) and transfers the packet through the transmitter/receiver portion 2 (step S6), at which the original packet used for the mirroring proceeds to step S5 where the above process will be executed.

If the value of TOS is consistent with the communication/quality confirmation identifier instructed by the manager device, the router 1 calculates a communication/quality confirmation result in the communication/quality confirmation determining portion 9 (step S10). The calculated result is notified to the manager device as the communication/quality confirmation result through the communicating portion 5 (step S11). Then, a protection route is selected (step S9) and the packet is transferred through the transmitter/receiver portion 2 (step S6). When the destination network corresponds to the router 1 itself, the packet is to be discarded (steps S12, S13).

It is to be noted that the selection of the protection route for transferring a packet can be performed by the following three methods, a part of which has been already described:

1) Transfer to all destination networks registered in the secondary routing table 8:

By referring to FIG. 2B showing the secondary routing table 8, assuming that the destination network is NW#1, the protection routes (output interfaces) are the interfaces IF#2 and IF#3;

2) Transfer to an interface for a route with a top priority among destination networks registered in the secondary routing table 8:

Also, by referring to FIG. 2B, assuming that the destination network is NW#1, the protection route (output interface) is the interface IF#2 with the lowest cost;

3) Transfer to all interfaces except interfaces having received packets:

Assuming that the packet is received from the interface IF#1, the destination routes are all of the interfaces IF#2-IF#n except the interface IF#1.

Now the above noted TOS will be described referring to FIG. 4

According to RFC2474, TOS (Type Of Service) area is called DS (Differentiated Services), where the first 6 bits are called DSCP (Differentiated Service Code Point) area and the remaining 2 bits are left as a reserved area. It is to be noted that in the currently used actual TCP/IP network, the TOS designation with this area is hardly used or often meaningless, so that identifiers (for example, communication confirmation=0x55 (01010101) and quality confirmation=0xAA(10101010) etc.) showing communication/quality confirming packets are set.

Figure 5:
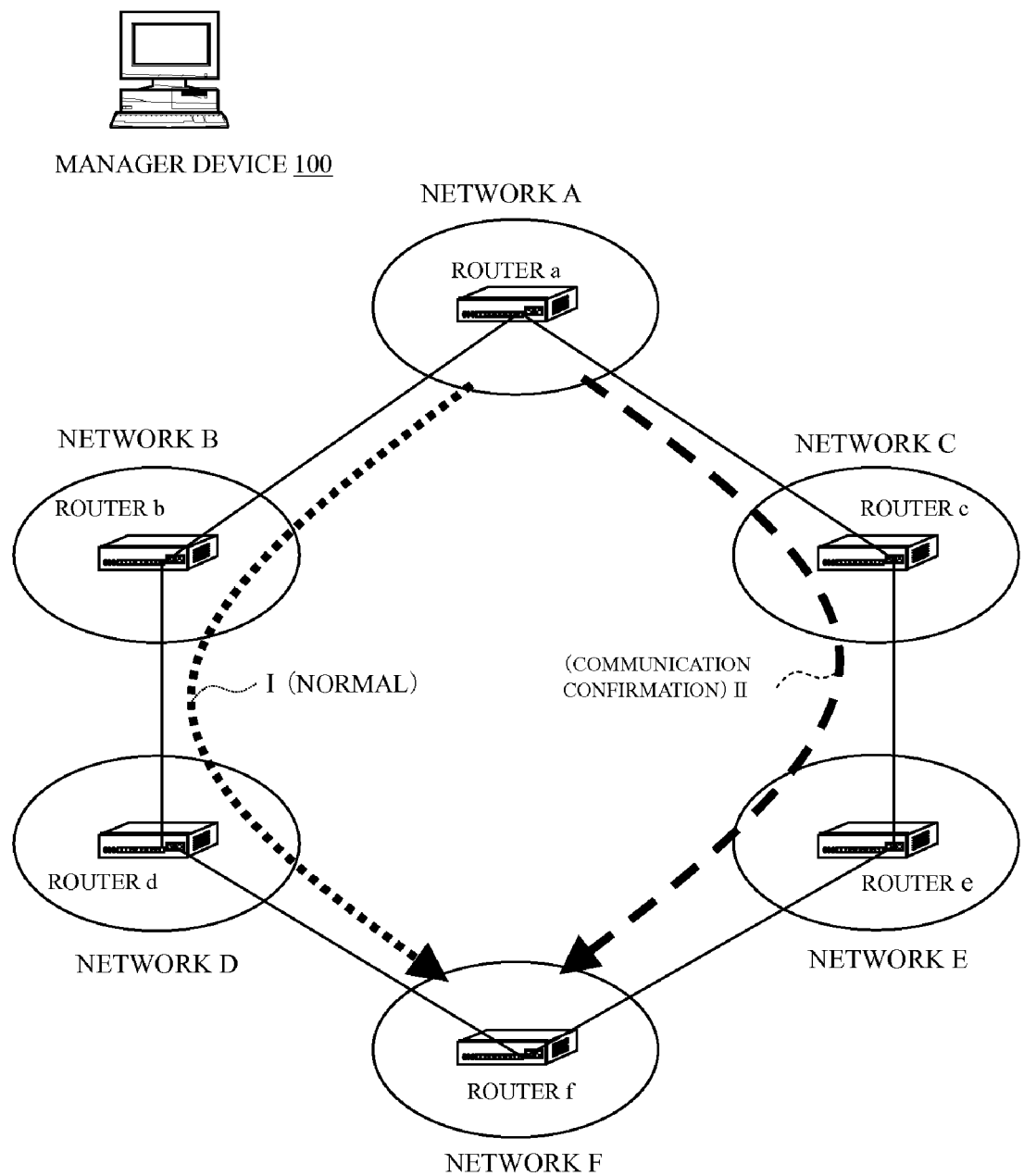
FIG. 5 is a network diagram showing a network operation example [1] in the embodiment.
Figure 6:
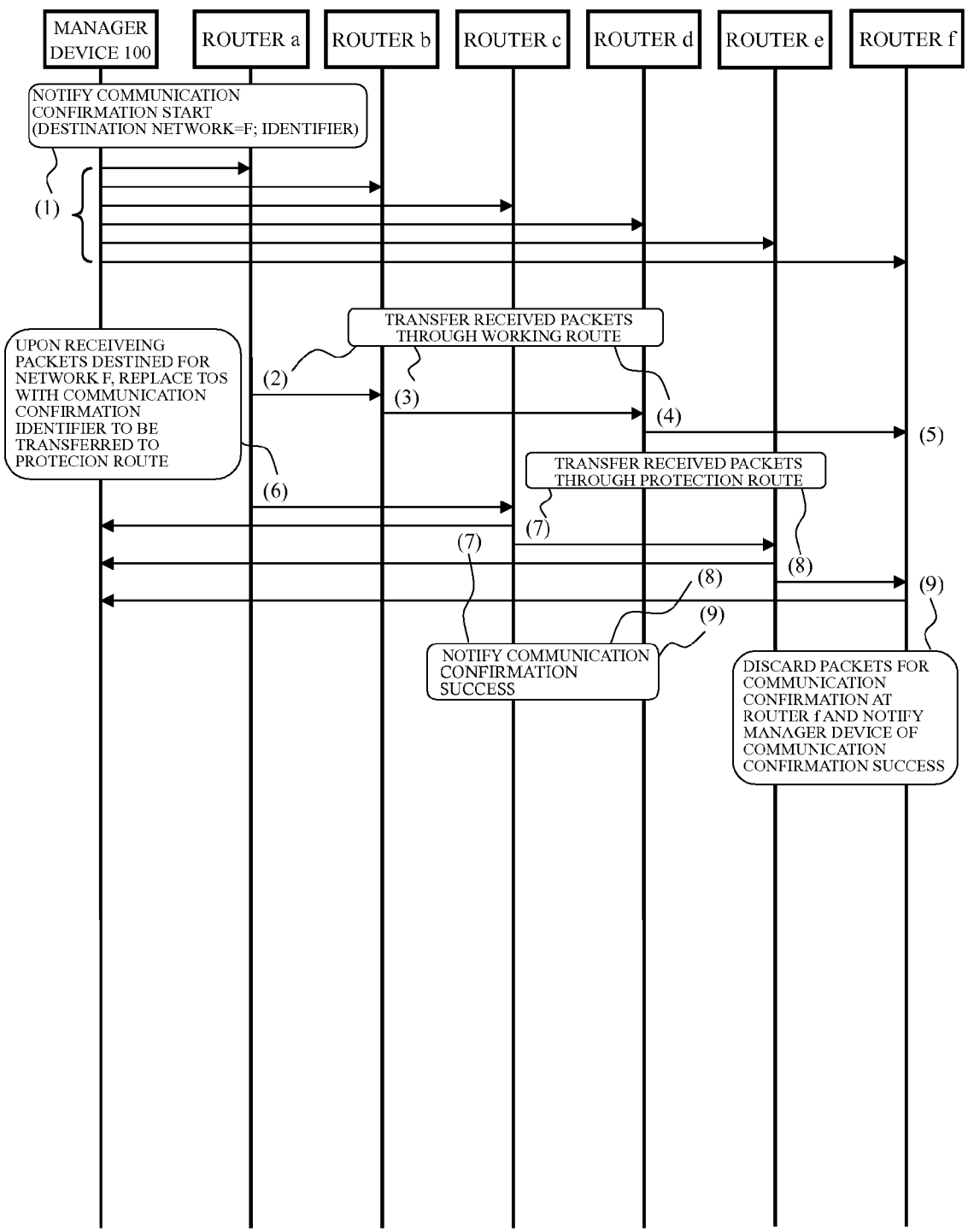
FIG. 6 is a sequence diagram showing a network operation example [1] in the embodiment.

Operation examples based on the structural example and operation flow chart of the router 1 will be described in the following:

Network Operation Example [1]: FIGS. 5 and 6

This network operation example [1] is applied to a system composed of routers "a"-"f" each having a gateway for networks A-F which can also be subnetworks, and a manager device 100 for telemonitoring these routers. This is similarly applied to the following network operation examples, respectively.

It is now supposed that at the time of transmitting unicast packet from the network A to the network F, a network design is normally made so as to select a route (working route) I of the networks A→B→D→F according to cost settings etc. as in an example shown in FIG. 5 while a route of the networks A→C→E→F is selected for a protection route II to perform a communication confirmation for the route II.

FIG. 6 shows a sequence along which in the network configuration of FIG. 5, a communication is established through the working route I from the network A to the network F and at the same time a communication confirmation for the protection route II is performed. This will be described in numerical order as shown:

(1) The manager device 100 notifies a communication confirmation start to the routers "a"-"f" of the networks A-F, respectively (step S1 in FIG. 3). At this time, the information of a communication confirmation identifier set in TOS shown in FIG. 4, the network F that is a destination network and the like is notified together;

(2) Since the communication confirmation identifier is inconsistent because it is not yet replaced while the router "a" having received a packet destined for the network F is consistent with or corresponds to the destination network, the packet is transferred to the network B along the working route I according to the routing procedures of steps S4→S7→S5→S6;

(3) The router "b" in the network B transfers the packet received from the router "a" to the network D along the usual route I (steps S1-S6);

(4) The router "d" in the network D transfers the packet received from the router "b" to the network F along the usual route I (steps S1-S6);

(5) The router "f" in the network F transfers the packet received from the router "d" to a network (not shown) subordinate to the router "f";

(6) On the other hand, the router "a" recognizes at step S4 that the destination of the packet is consistent with the network F designated by the manager device 100 and proceeds to step S7, at which when the communication confirmation identifiers are mutually inconsistent, the packet transferred to the router "b" in above (2) is mirrored or copied and the TOS area shown in FIG. 4 is replaced with a communication confirmation identifier indicating a communication confirming packet (step S8) and the packet is transferred to the network C in the protection route II (steps S9, S6);

(7) When the router "c" in the network C checks the TOS area of the packet received (step S7) and recognizes it as the communication confirming packet from the identifier, the router "c" notifies a communication confirmation success to the manager device 100 (step S11). Also, the router "c" transfers the packet received to the router "e" in the network E in the protection route II (steps S12, S9, S6);

(8) When the router "e" checks the TOS area of the packet received similarly and recognizes it as the communication confirming packet, the router "e" notifies the communication confirmation success to the manager device 100 (steps S4, S7, S11). Also, the router "e" transfers the packet received to the router "f" in the network F in the protection route II (steps S9, S6);

(9) When recognizing that the packet received, in which the TOS area is set with the communication confirmation identifier, is a communication confirming packet, the router "f" notifies the communication confirmation success to the manager device 100 (steps S4, S7, S11). Also, when recognizing that the packet received is a packet destined for the router "f" itself from the destination address within the IP header (step S12), the router "f" discards the communication confirming packet (step S13).

Figure 7:
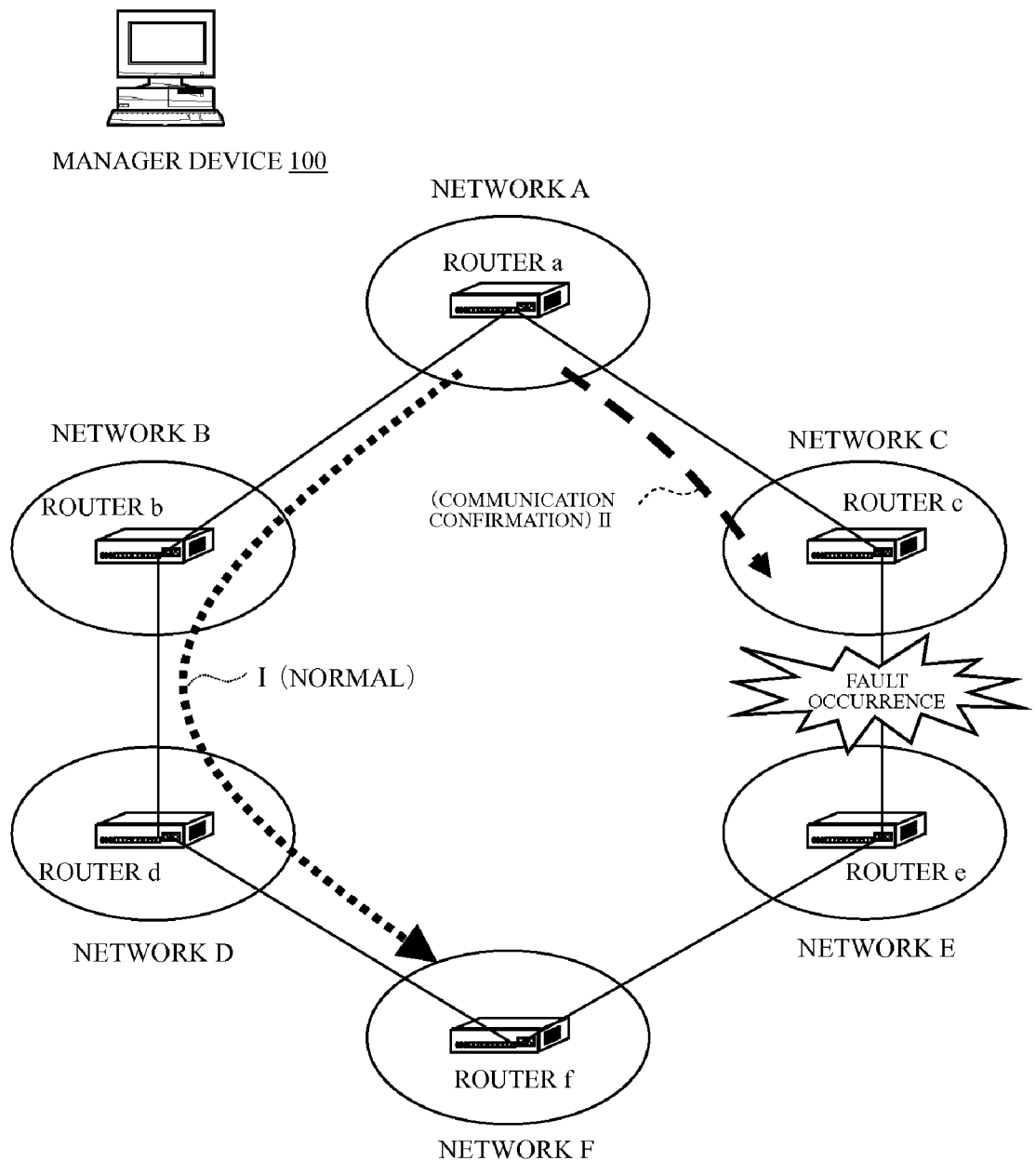
FIG. 7 is a network diagram showing a network operation example [2] in the embodiment.
Figure 8:
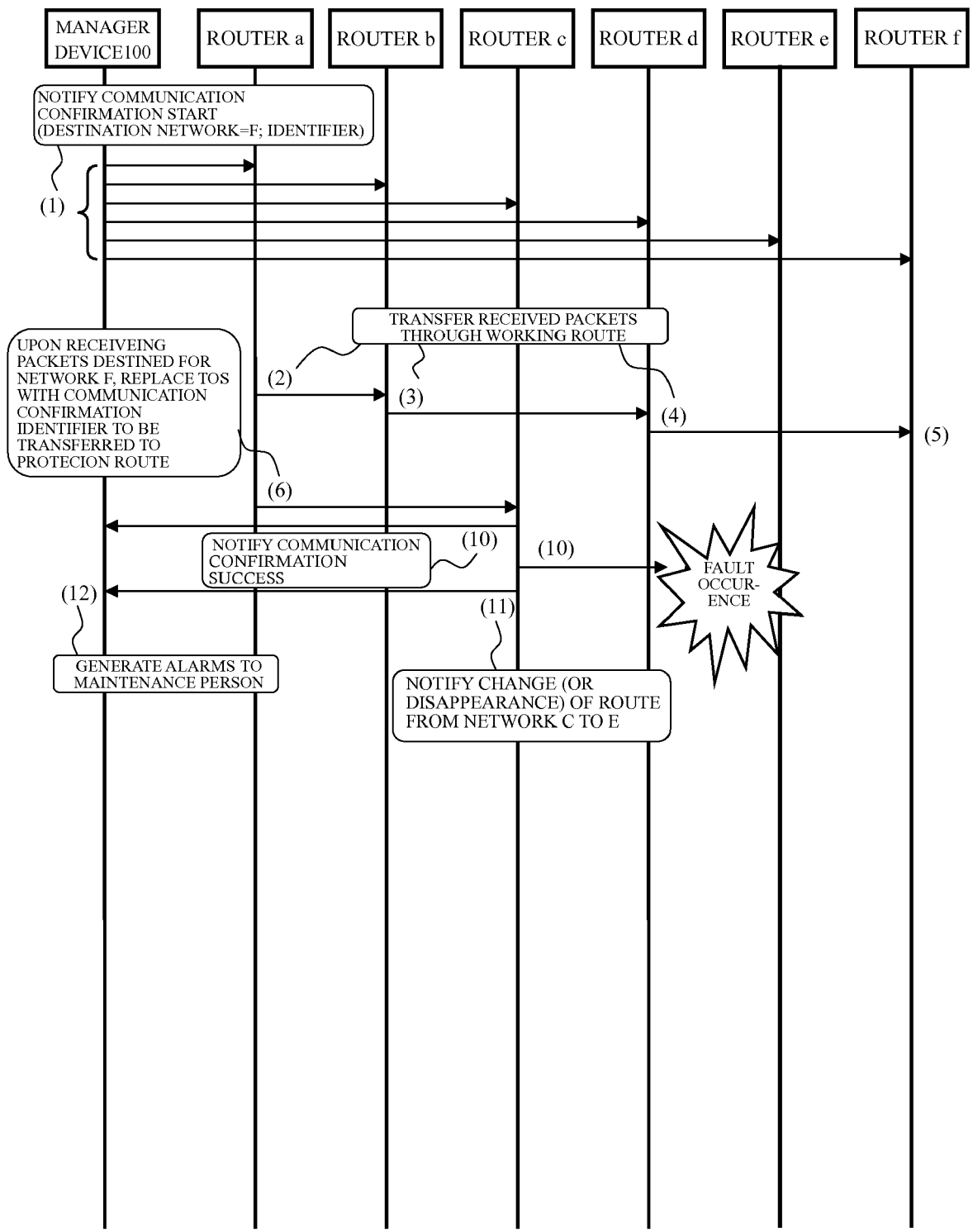
FIG. 8 is a sequence diagram showing a network operation example [2] in the embodiment.

Network Operation Example [2]: FIGS. 7 and 8

A sequence of performing packet communications through the working route from the network A to the network F and of detecting a case where a fault occurs in the protection route in the network shown in FIG. 7 is shown in FIG. 8.

It is assumed that the network is preliminarily designed such that when a unicast packet is transmitted from the network A to the network F, an optimum route (working route I) of the networks A→B→D→F may be normally selected according to cost settings etc., where a fault occurs in a line between the network C and the network E.

First, the procedures (1)-(6) through the working route I in FIG. 8 are the same as the procedures (1)-(6) in FIG. 6, so that only the following procedures will be described:

(10) When recognizing that the communication confirmation identifiers are mutually consistent by checking the TOS area of the packet received (step S7), the router "c" in the network C notifies the communication confirmation success to the manager device 100 (step S11). Although the router "c" tries to transfer the packet received to the router "e" in the protection router II, a fault occurs therebetween, so that it can not transfer the packet due to the route being changed (or extinguished). Therefore, as shown in FIG. 7 the communication confirmation route II terminates at the router "c";

(11) The router "c" detects a fault occurrence between the routers "c"-"e" and notifies the communication confirmation failure to the manager device 100;

(12) The manager device 100 having received the communication confirmation failure notification from the router "c" emits an alarm to a maintenance person for notifying the abnormality.

Figure 9:
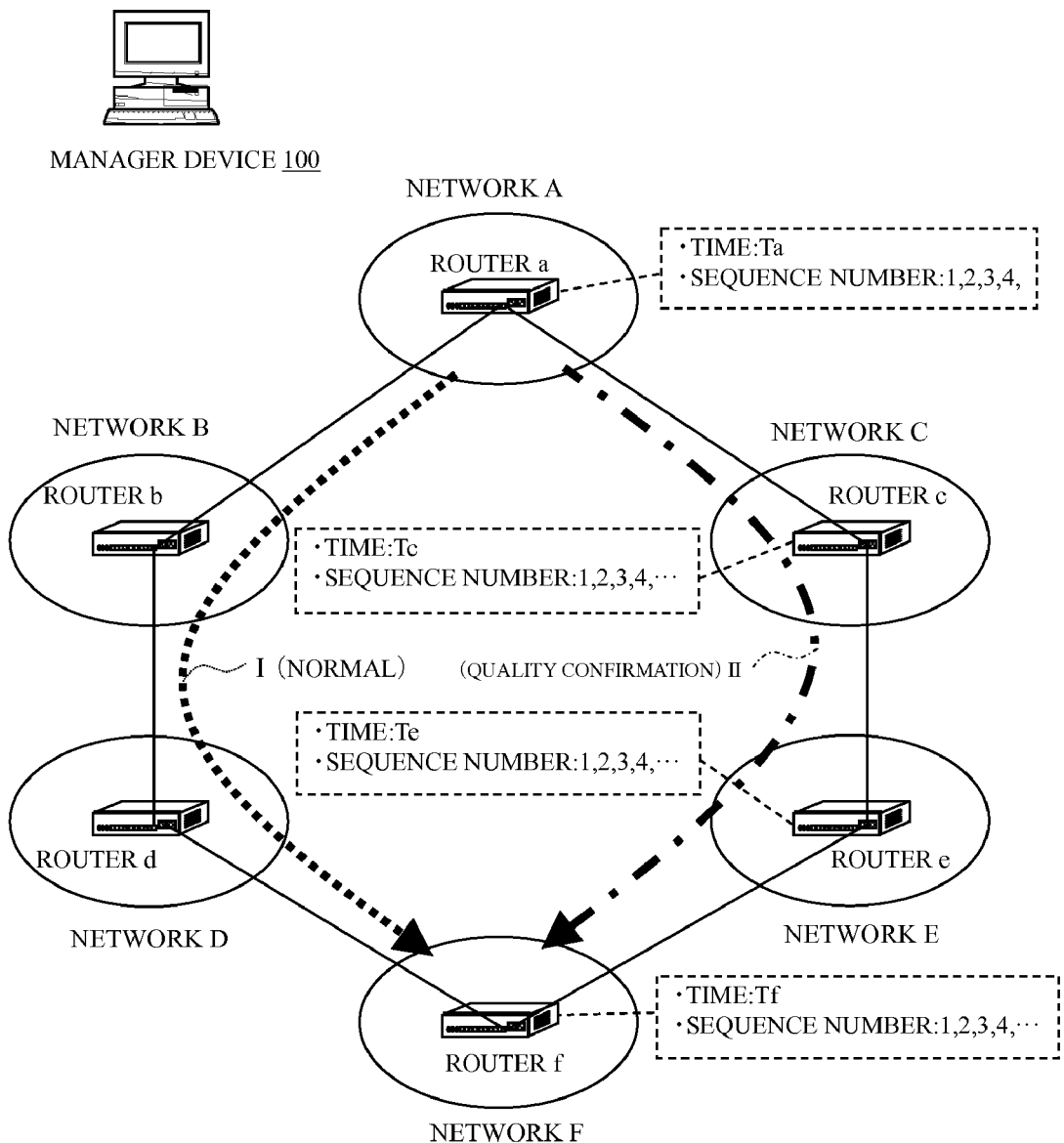
FIG. 9 is a network diagram showing a network operation example [3] in the embodiment.
Figure 10:
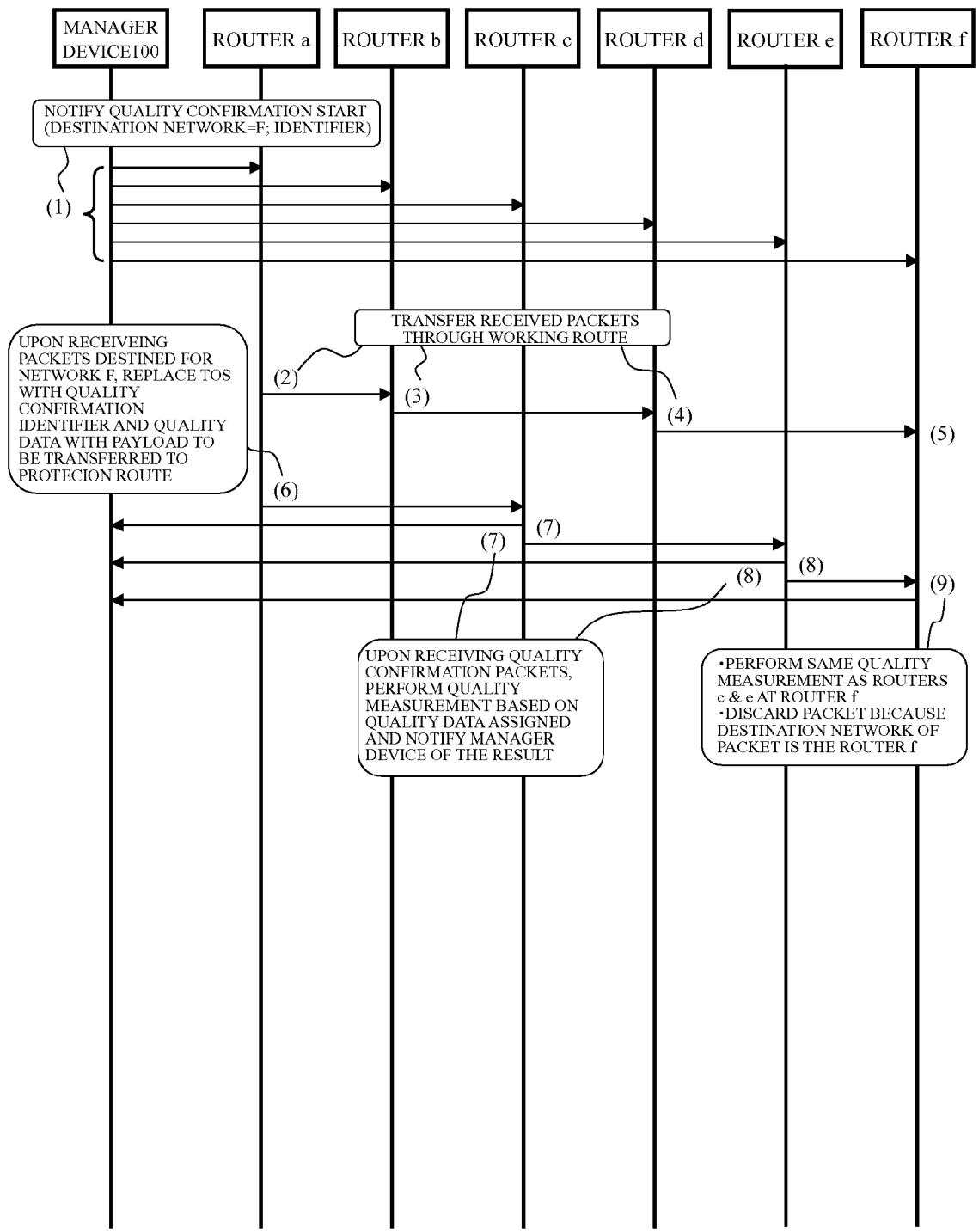
FIG. 10 is a sequence diagram showing a network operation example [3] in the embodiment.

Network Operation [3]: FIGS. 9 and 10

A sequence of performing a communication through a route from the network A to the network F and at the same time a quality confirmation for the protection route in a network shown in FIG. 9 is shown in FIG. 10.

It is now assumed that a time when the router "a" transmits a quality confirming packet is Ta, a timer when the router "c" receives the quality confirming packet is Tc, a time when the router "e" receives the quality confirming packet is Te and a time when the router "f" receives the quality confirming packet is Tf, and that sequence numbers of packets received by the router "a" through the router "f" are respectively 1, 2, 3, 4 . . . .

First, normal transmission packets pass through the working route I as with the above while the quality confirmation is performed through the protection route II of the routers "a"→"c"→"e"→"f", where the protection route at this time uses a dashed-dotted line in FIG. 9 to be distinguished from the protection route II at the time of communication confirmation as described above.

(1) First, the manager device sets an identifier indicating a quality confirming packet to the routers "a"-"f" in the networks A-F respectively to be notified for the quality confirmation (step S1). Also, the manager device simultaneously notifies a threshold value for alarm notification given to the manager device itself in a case where the quality is remarkably poor as a result of the quality measurement.

The procedures (2)-(5) shown in FIG. 10 are the same as those in the above-mentioned network operation examples [1] and [2], so that only the following procedures will be described:

(6) From the fact that the destination of the packet is consistent with the network instructed by the manager device 100 (step S4), the router "a" mirrors or copies the packet transferred to the router "b" and replaces the TOS area with an identifier indicating the quality confirming packet (step S8). Also, the router "a" replaces data (payload) following the IP header with qualification data and transfers the packet to the network C in the protection route II;

(7) By confirming the TOS area of the packet received and recognizing that the packet corresponds to the quality confirming packet (step S7), the router "c" acquires quality confirming data following the IP header, where a transmission delay (Tc−Ta) between the routers "a"-"c" from the transmission time Ta at the router "a" to the reception time Tc at the router "c" is calculated (see FIG. 11A). While at the first reception time a sequence number assigned is recorded, for the receptions of the second packet and the following packets it is checked whether or not the sequence number of the quality confirming packet received at present is consistent with the sequence number of the packet last received being incremented by "1", thereby detecting a packet loss (see FIG. 11B) or reversed reception (step S10);

After having notified the manager device of the above quality measurement result (step S11), the router "c" assigns the time Tc when the router "c" has received the quality confirming packet to a part of the quality confirming data after the IP header and transfers the packet to the network E in the protection route II (steps S9, S6);

(8) The router "e" performs the same quality measurement as the router "c" and transfers the packet to the network F in the protection route II;

(9) When receiving a packet received having the TOS area set with the quality confirmation identifier, the router "f" recognizes that the packet corresponds to the quality confirming packet (step S7) and acquires the quality confirming data following the IP header, where a transmission delay (Tf−Te) between the routers "e"-"f" from a transmission time Te at the router "e" to the reception time Tf at the router "f" is calculated. Also, the sequence number of the packet received at present is compared with that of the quality confirming packet last received being incremented by "1" to check whether or not a packet loss or the like occurs (step S10). When it is recognized that the packet received is a packet destined for the network itself from the destination address within the IP header, the quality confirming packet is discarded (steps S12, S13).

Figure 11:
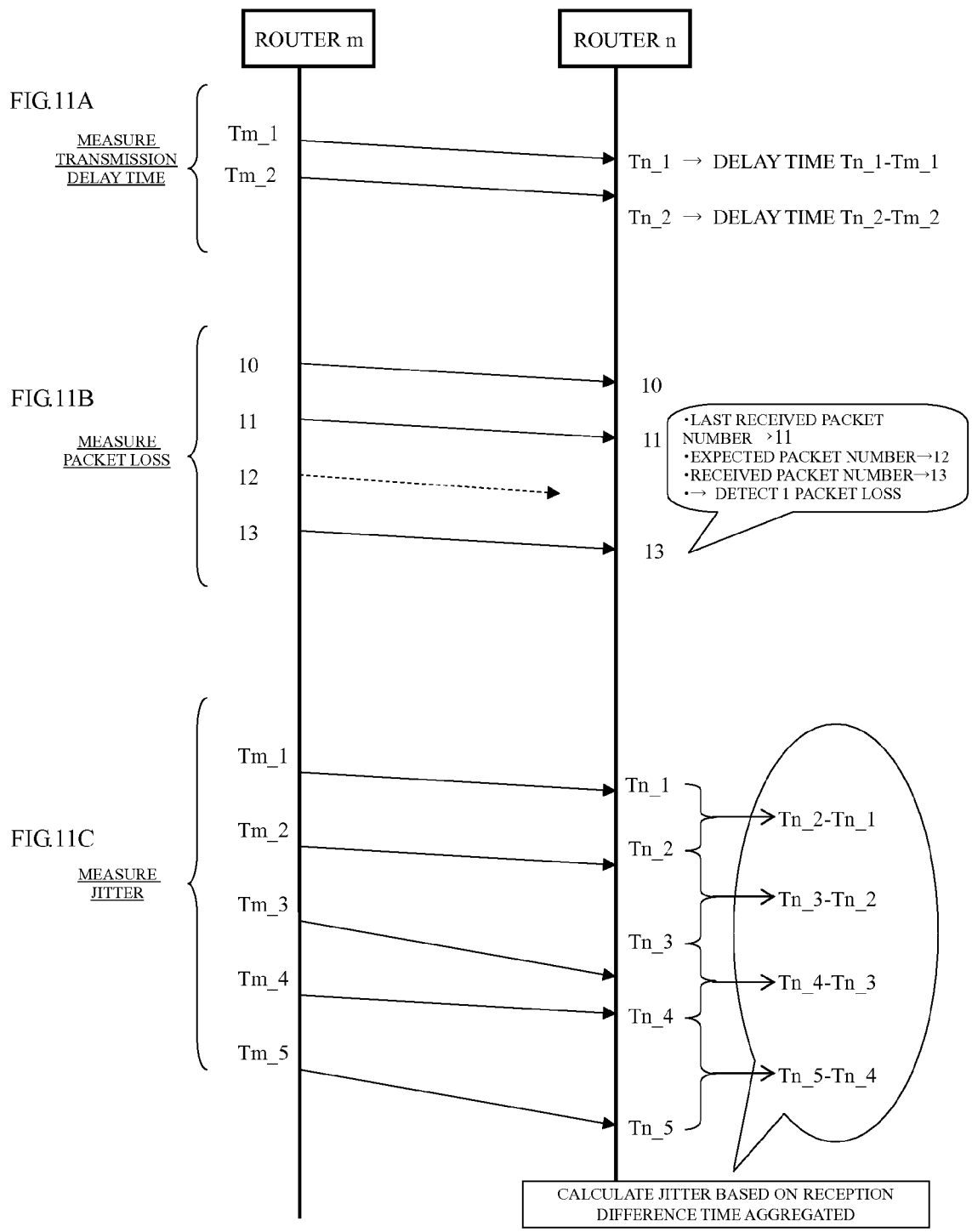
FIGS. 11A-11C are diagrams showing a measurement example of a line quality of network.

A mechanism for performing the quality confirmation between the routers shown in FIG. 11 will now be described in general:

Measurement of Transmission Delay Time: FIG. 11A

Assuming that in a transmitting router "m", a time when a quality confirming packet is transmitted is Tm and in a router "n" a time when the quality confirming packet is received is Tn, the time difference between them is measured, thereby measuring a transmission delay time between the routers "m"-"n".

Measurement of Packet Loss: FIG. 11B

In the transmitting router "m", a sequence number (consecutive number) is assigned upon the transmission of the quality confirming packet. In the receiving router "m", the sequence number assigned to the first quality confirming packet is recorded and the sequence number of the quality confirming packet received at present and the one last received being incremented by "1" for the second packet and the following packets, thereby checking occurrences of packet loss or reversed reception.

Measurement of Jitter: FIG. 11C

With respect to a packet with a fixed transmission interval such as a unicast stream used in voice communications (VoIP) or a multicast stream used in a video distribution, the jitter can be measured upon quality confirmation in the protection route. In a receiving router, the reception times of the first and the second quality confirming packet are recorded, so that for the third packet and the following packets a time difference from the quality confirming packets presently and last received is calculated to obtain the jitters.

Figure 12:
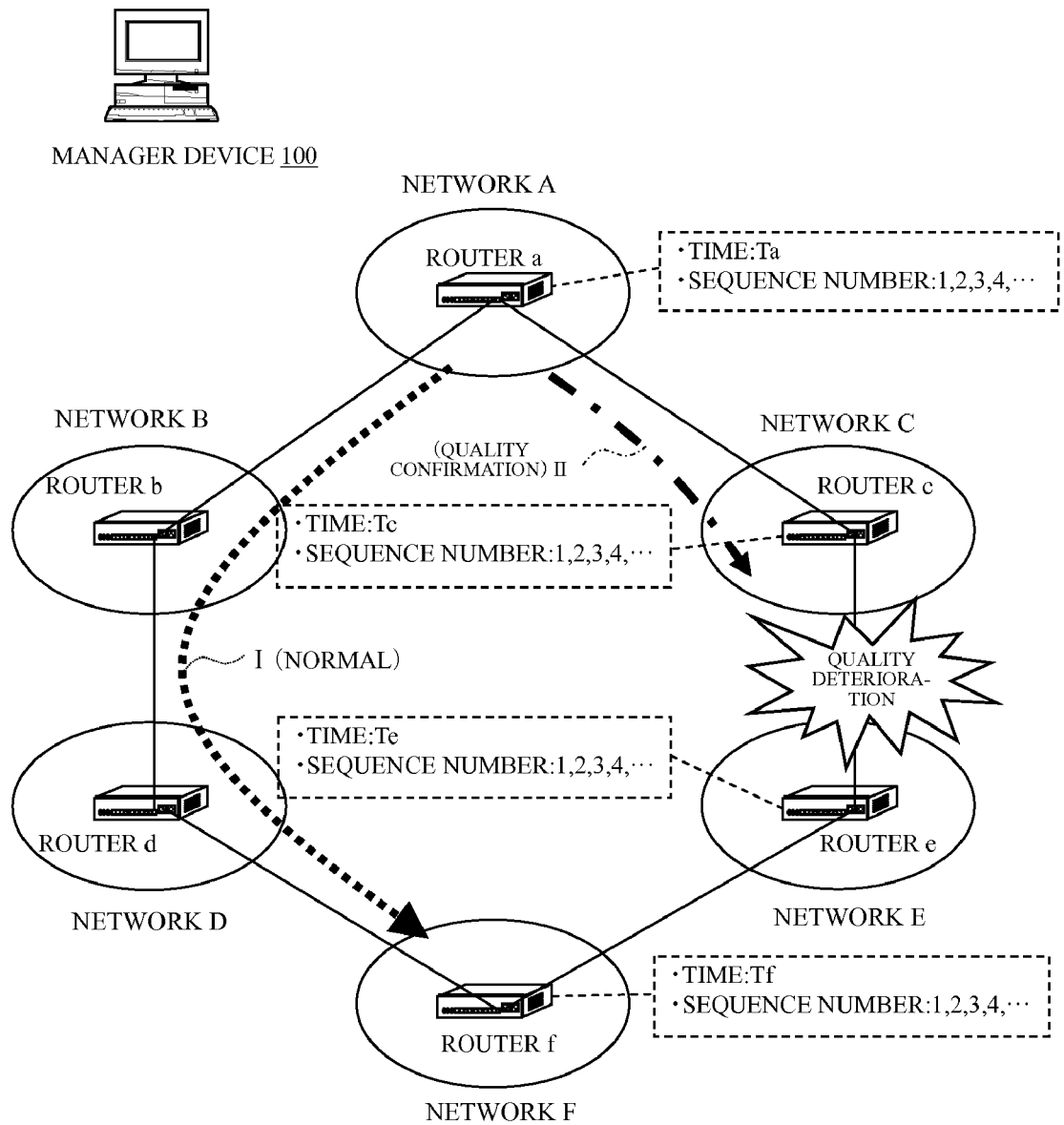
FIG. 12 is a network diagram showing a network operation example [4] in the embodiment.
Figure 13:
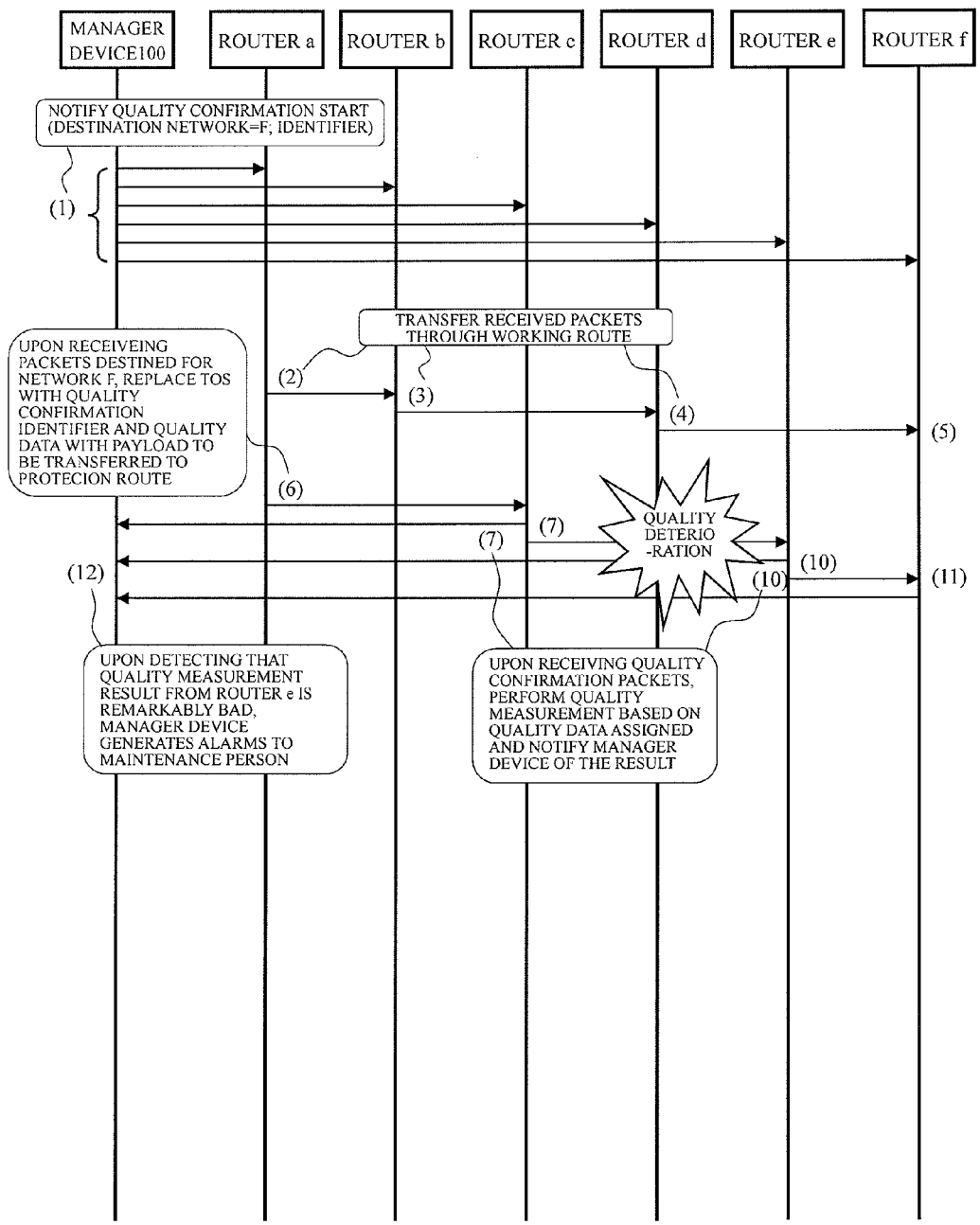
FIG. 13 is a sequence diagram showing a network operation example [4] in the embodiment.

Network Operation Example [4]: FIGS. 12 and 13

A sequence of performing a communication for the network F from the network A in the working route I and at the same time the quality confirmation in the protection route II in a network shown in FIG. 12 is shown in FIG. 13.

Also in this operation example it is assumed that a time when the router "a" transmits a quality confirming packet is Ta, a time when the router "c" receives the quality confirming packet is Tc, a time when the router "e" receives the quality confirming packet is Te and a time when the router "f" receives the quality confirming packet is Tf, and that sequence numbers of packets received at the routers "a"-"f" are respectively 1, 2, 3, 4 . . . , where a fault occurs in a line between the network C and the network E and the quality of the line between the routers "c"-"e" lowers.

First, the procedures (1)-(7) are the same as the procedures (1)-(7) in the network operation example [3], so that only the following procedures will be described:

(10) The router "e" performs the quality measurement similar to the router "c" (step S10). At this time, the line quality is deteriorated between the routers "c"-"e", resulting in a bad quality measurement. The router "e" notifies the manager device 100 of the quality measurement result (step S11) and transfers the packet to the network F in the protection route II (steps S9, S6);

(11) Upon receiving a packet with the TOS area being set with the quality confirmation identifier, the router "f" recognizes that the packet is a quality confirming packet (step S7) and acquires quality confirming data following the IP header, where a transmission delay (Tf−Te) between the routers "e"-"f" from the transmission time Te at the router "e" to the reception time Tf at the router "f" is calculated. Also, the sequence number of the packet received at present is compared with the sequence number of a quality confirming packet last received being incremented by "1" to check an occurrence of packet loss or the like (step S10). Confirming that the packet received is a packet destined for the router itself from the destination address within the IP header, the quality confirming packet is discarded (steps S12, S13);

(12) While the manager device receives quality measurement results from the routers, when receiving the quality measurement result having remarkably bad data from the router "e", the manager device generates an alarm to a maintenance person for caution.

Figure 14:
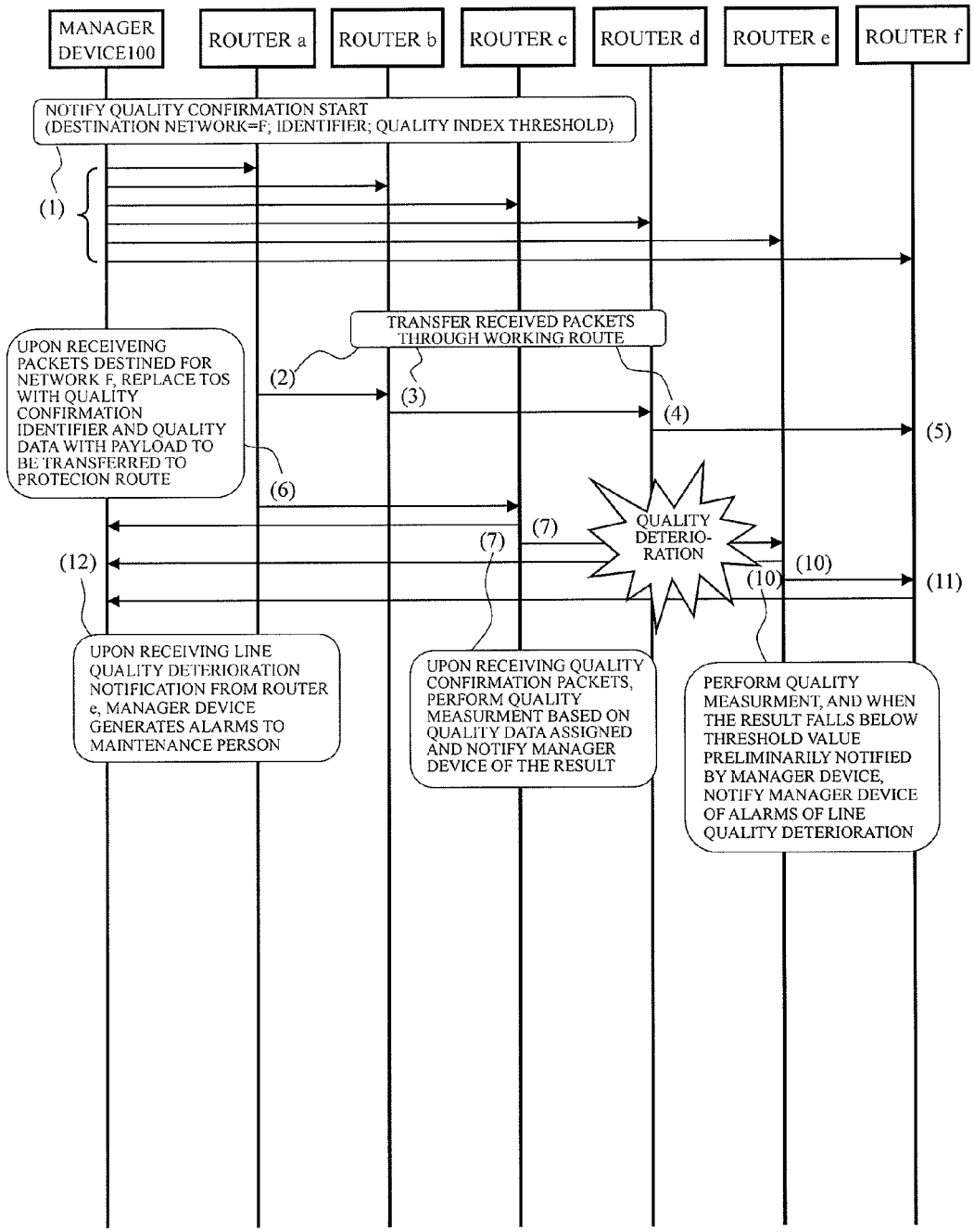
FIG. 14 is a sequence diagram showing a modification of FIG. 13.

Network Operation Example [5]: FIG. 14

In this operation example, as with the above network operation example [4], when a communication along a route from the network A to the network F is performed and simultaneously a quality confirmation of the protection route is performed in the network shown in FIG. 12, the routers are notified of an index of line quality as a threshold value in advance so that they may generate an alarm when having detected the line quality. Therefore, among the procedures of the network operation example [4], only the following procedures (10) and (12) are different:

(10) The router "e" performs the quality measurement in the same way as the router "c". At this time, the line quality is deteriorated between the routers "c"-"e", resulting in a bad quality measurements. Determining that the quality measurement is worse than the index (threshold value) of the quality data preliminarily notified from the manager device 100, the router "e" emits a line quality deterioration alarm to the manager device 100 for caution, and transfers the packet to the network F in the protection route;

(12) Upon receiving a line quality deterioration alarm from the router "e", the manager device 100 emits an alarm to a maintenance person for caution.

Multicast Mode

Figure 15:
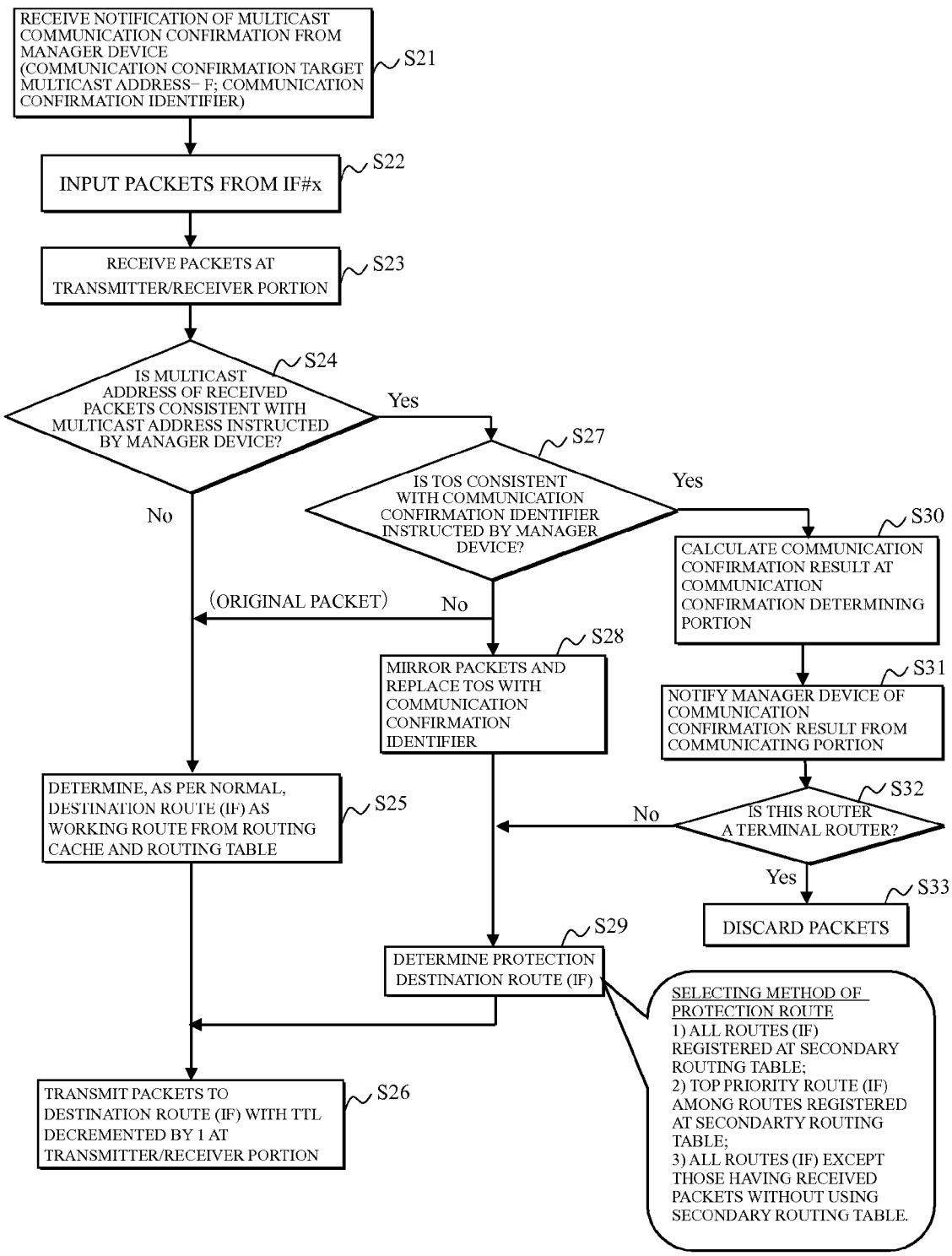
FIG. 15 is a flow chart of a multicast operation of the router in FIG. 1.

Also for a multicast packet transmission, the structure of each router can use the one shown in FIG. 1 and the operation flow is as shown in FIG. 15, that is similar to that of FIG. 3 but is different in that at step S21 a multicast communication confirmation notification is received instead of receiving a communication/quality confirmation notification at step S1 in FIG. 3 from the manager device 100.

This notification includes a communication confirmation target multicast address and a communication confirmation identifier, so that the difference is only the communication confirmation being processed at steps S24, S27, S28, S30 and S31 while the other steps S22, S23, S25, S26, S29, S32 and S33 correspond to the steps S2, S3, S5, S6, S9, S12, and S13 in FIG. 3, respectively.

Figure 16:
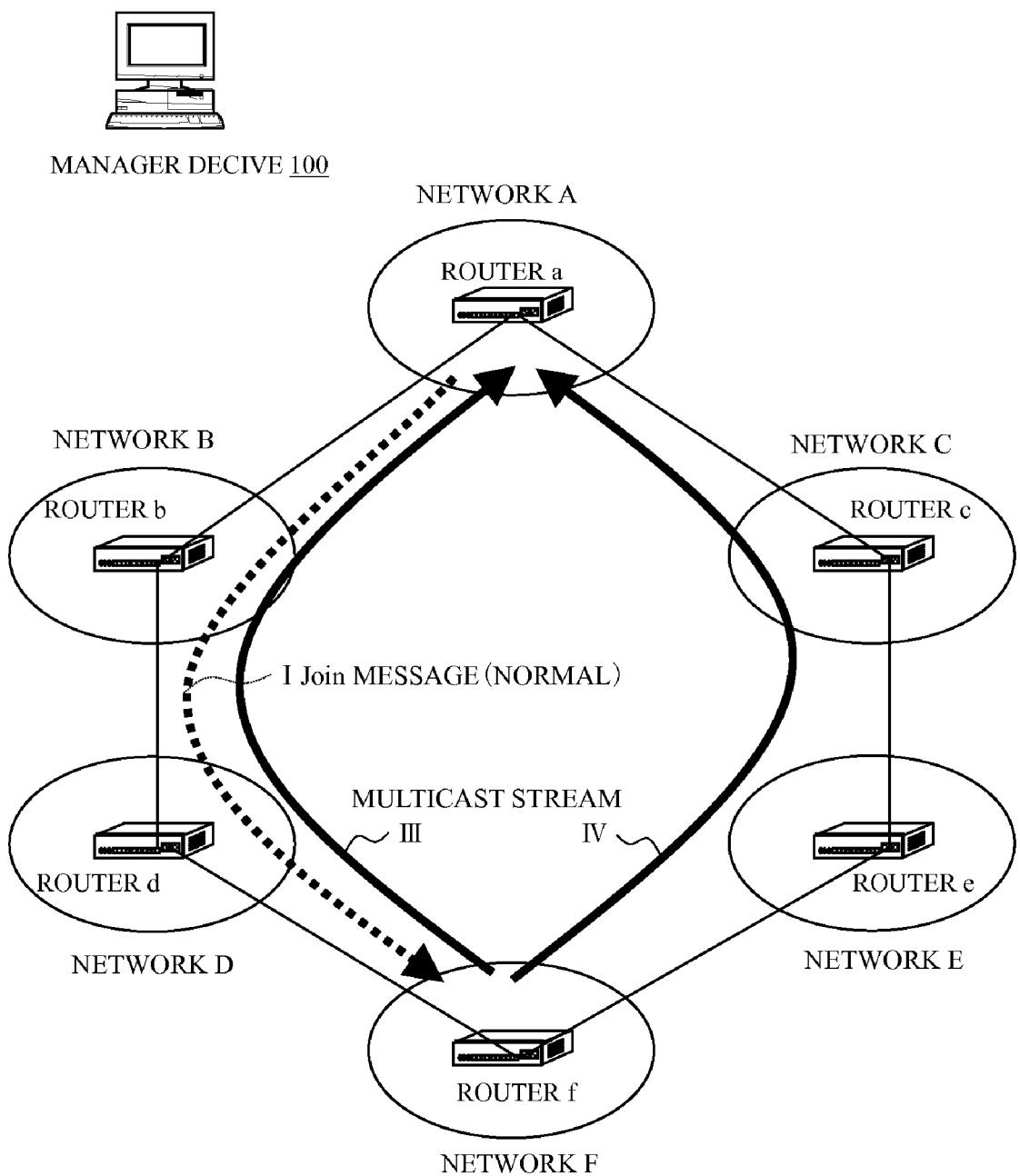
FIG. 16 is a network diagram showing a network operation example [5] in the embodiment.
Figure 17:
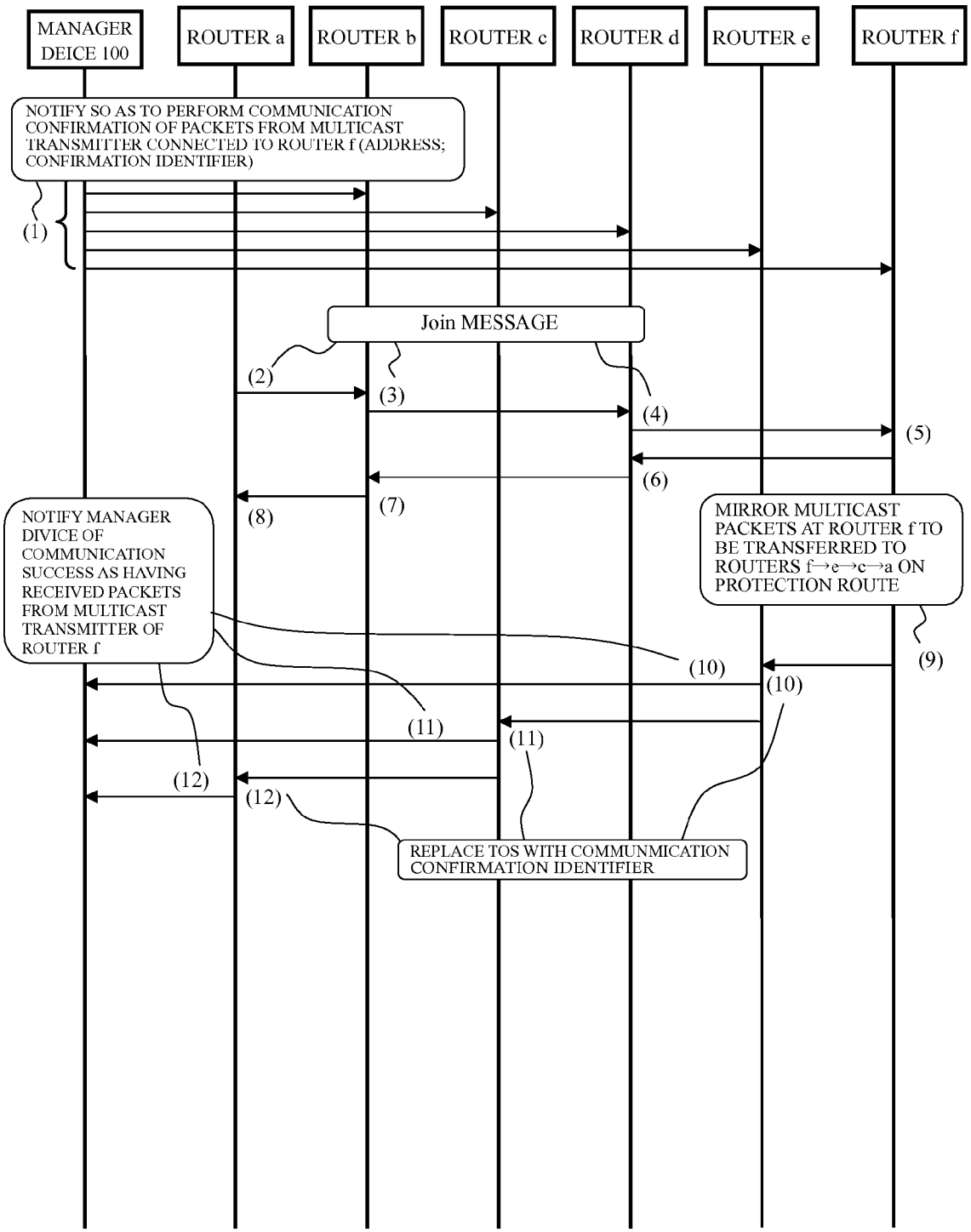
FIG. 17 is a sequence diagram showing a network operation example [5] in the embodiment.

Network Operation Example [6]: FIGS. 16 and 17

In a network shown in FIG. 16, a multicast receiver (decoder: not shown) is provided in the network A and a multicast transmitter (encoder: not shown) is provided in the network F, a sequence in which the multicast receiver subordinate to the network A receives a multicast stream from the multicast transmitter subordinate to the network F and simultaneously a multicast communication confirmation in the protection route is performed is shown FIG. 17, where it is adapted that the shortest path tree (SPT) selects a route III of the networks F→D→B→A according to cost settings or the like.

It is to be noted that the following procedures (1)-(8) are normal multicast operations and are not shown in FIG. 15:
(1) The manager device 100 makes a notification to the routers "a"-"f" in the respective networks in which an identifier indicating a multicast communication confirming packet and a communication confirmation multicast address for the multicast transmitter subordinate to the network F are set (step S21), and additionally makes a notification of a timeout time for determining a communication failure (timeout);
(2) When video information distributed from the multicast transmitter subordinate to the network F is received at the multicast receiver subordinate to the network A, the router "a" that is a destination router of the network A transmits a Join message along the normal route I to the router "b";
(3) The router "b" transfers the Join message to the network D along the normal route I;
(4) The router "d" transfers the Join message to the network F along the normal route I;
(5) Having received the Join message without a communication confirmation identifier assigned in the TOS area, the router "f" starts a multicast distribution to the receiving interface;
(6) The router "d" having received the multicast stream transfers it to the network B along the normal route III;
(7) The router "b" having received the multicast stream transfers it to the network A along the normal route III;
(8) The router "a" transfers the multicast stream received from the interface on the side of the router "b" in the working route I to the multicast receiver subordinate thereto;
(9) Having received the Join message with the communication confirmation identifier set in the TOS area, the router "f" starts the multicast distribution toward the receiving interface. At this time, the router "f" mirrors the multicast packet and transfers it through a protection line IV of the routers "f"→"e"→"c"→"a" based on the secondary routing table 8;
(10) If the multicast stream distributed is one for awaiting the reception of communication confirmation (steps S24, S27 in FIG. 15), the router "e" notifies the manager device 100 of the multicast communication confirmation success (step S31), and transfers the multicast stream to the router "c" (steps S29, S26);
(11) If the multicast stream distributed is one for awaiting the reception of communication confirmation (steps S24, S27 in FIG. 15), the router "c" notifies the manager device 100 of the multicast communication confirmation success (step S31), and transfers the multicast stream to the router "a";
(12) If the multicast stream distributed is one for awaiting the reception of communication confirmation (steps S24, S27 in FIG. 15), the router "a" notifies the manager device 100 of the multicast communication confirmation success (step S31). Also, the router "a" recognizes that the multicast stream received from the interface on the side of the router "c" in the protection route IV is one for the communication confirmation to be discarded and not transferred to the multicast receiver (steps S32, S33).

Figure 18:
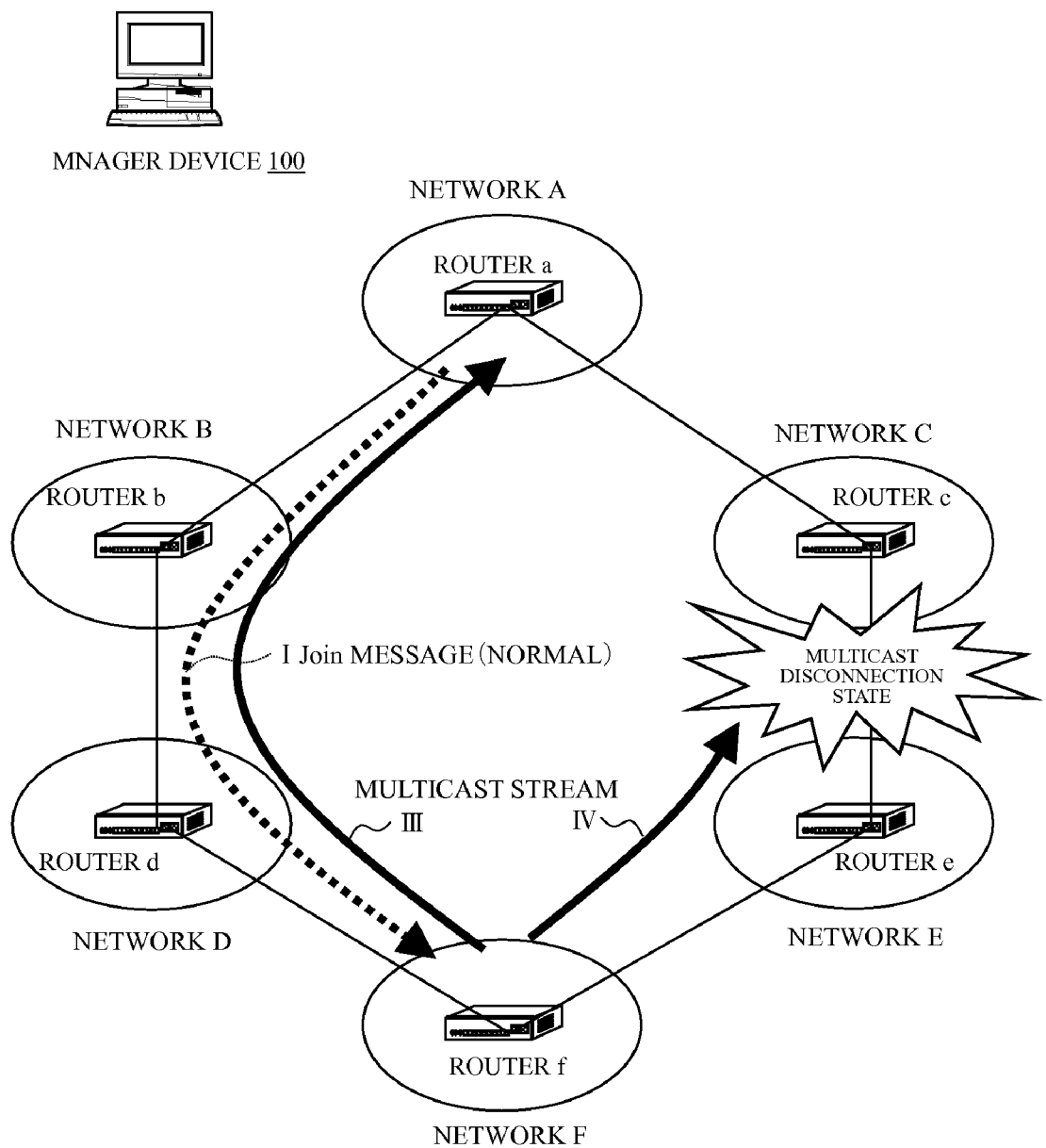
FIG. 18 is a network diagram showing a network operation example [6] in the embodiment.
Figure 19:
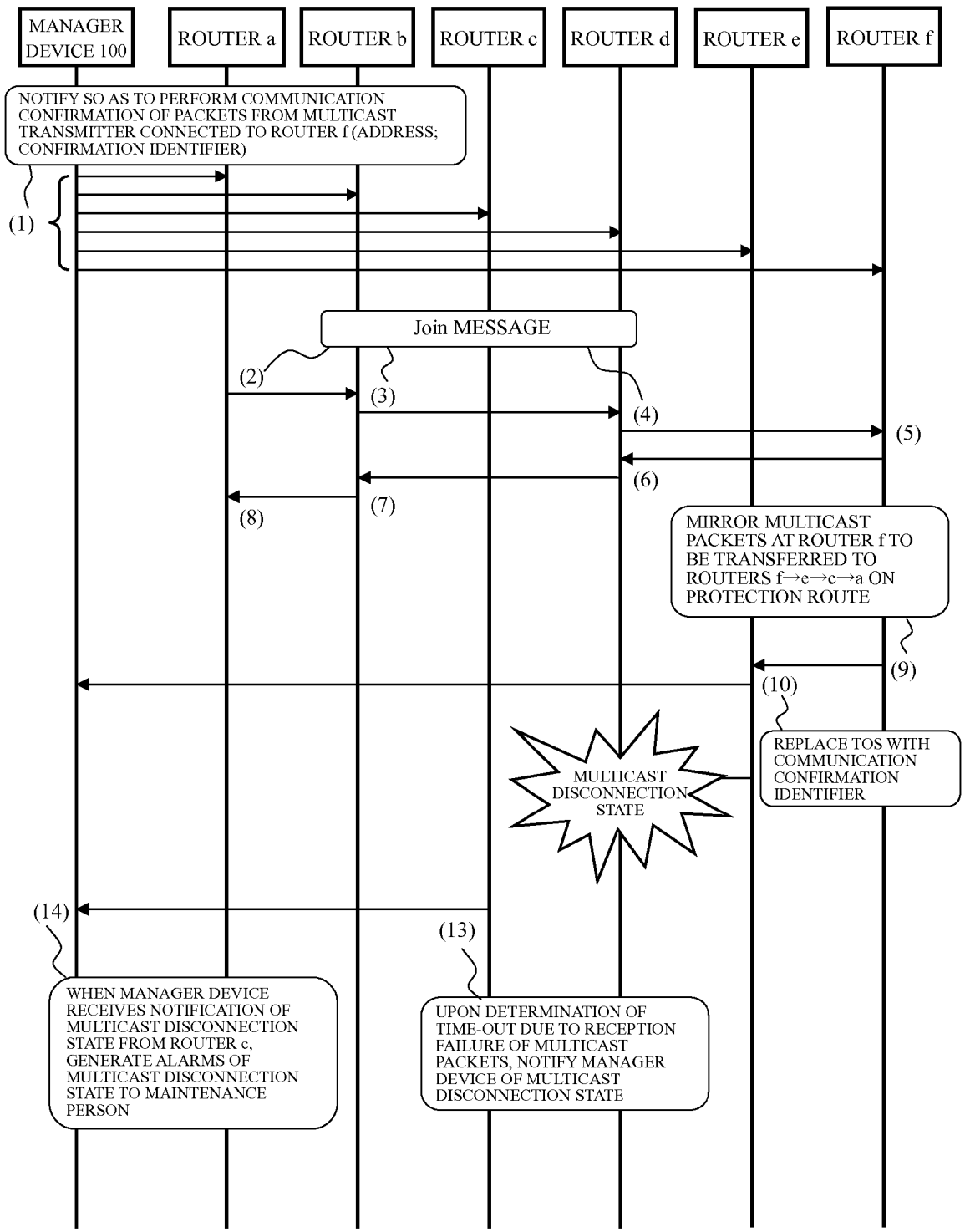
FIG. 19 is a sequence diagram showing a network operation example [6] in the embodiment.

Network Operation Example [7]: FIGS. 18 and 19

In a network shown in FIG. 18, a sequence in which the multicast receiver subordinate to the network A receives a multicast stream from the multicast transmitter subordinate to the network F and simultaneously detects a fault occurring in the protection route IV is shown FIG. 19, where it is assumed that a fault occurs in a line between the routers "c" and "e" and a multicast stream IV is not communicated.

Among the procedures (1)-(12) in FIG. 19, the procedures (1)-(10) are the same as those shown in FIG. 17, so that only the following procedures will now be described:
(13) The router "c" can not receive a multicast stream due to a multicast interruption between the routers "c"-"e". If the router "c" can not receive the multicast stream within the timeout time preliminarily notified by the manager device 100, it notifies the manager device 100 of the multicast communication confirmation failure;
(14) The manager device 100 having received the multicast communication confirmation failure notification from the router "c" emits to a maintenance person an alarm of multicast interruption for caution.

It is also to be noted that the present invention is not limited by the above-mentioned embodiments, and it is obvious that various modifications may be made by one skilled in the art based on the recitation of the claims.)

The invention claimed is:

1. A route confirmation method comprising:
a first step of receiving a notification of starting a protection route communication confirmation or quality confirmation from a manager device including a destination network address and a confirmation identifier indicating a type of confirmation and storing the destination network address and the confirmation identifier instructed by the notification,
a second step of mirroring a received unicast packet addressed to the destination network address instructed by the notification and setting the confirmation identifier instructed by the notification in a predetermined area within a header of the packet obtained by the mirroring to be transferred to a preselected protection route when the received unicast packet addressed to the destination network address instructed by the notification does not include the confirmation identifier instructed by the notification, and
a third step of notifying the manager device of a result of the communication confirmation or quality confirmation and transferring the received unicast packet to the protection route when the received unicast packet is addressed to the destination network address instructed by the notification and includes the confirmation identifier instructed by the notification.

2. The route confirmation method as claimed in claim 1, further comprising:
a step of preliminarily receiving a threshold value of a line quality, and
a step of notifying the manager device of an alarm when a line quality of the received unicast packet falls below the threshold value upon receiving the unicast packet.

3. The route confirmation method as claimed in claim 1, further comprising a step of notifying the manager device of a failure of the communication confirmation upon detecting a fault of the protection line.

4. The route confirmation method as claimed in claim 1, wherein all interfaces registered in a prepared secondary routing table are selected for the protection line.

5. The route confirmation method as claimed in claim 1, wherein an interface for a route with a top priority among all interfaces registered in a prepared secondary routing table is selected for the protection line.

6. The route confirmation method as claimed in claim 1, wherein all interfaces other than interfaces having received the unicast packet among interfaces linked up are selected for the protection line.

7. A route confirmation method comprising:
a first step of receiving a notification of starting a protection route multicast communication confirmation from a manager device including a multicast address and a communication confirmation identifier and storing the multicast address and the communication confirmation identifier instructed by the notification,
a second step of mirroring a received multicast packet addressed to the multicast address instructed by the notification and setting the communication confirmation identifier instructed by the notification in a predetermined area within a header of the packet obtained by the mirroring to be transferred to a preselected protection route when the received multicast packet addressed to the multicast address instructed by the notification does not include the communication confirmation identifier instructed by the notification, and
a third step of notifying the manager device of a result of the multicast communication confirmation and transferring the received multicast packet to the protection route when the received multicast packet is addressed to the multicast address instructed by the notification and includes the communication confirmation identifier instructed by the notification.

8. The route confirmation method as claimed in claim 7, wherein all interfaces registered in a prepared secondary routing table are selected for the protection line.

9. The route confirmation method as claimed in claim 7, wherein an interface for a route with a top priority among all interfaces registered in a prepared secondary routing table is selected for the protection line.

10. The route confirmation method as claimed in claim 7, wherein all interfaces other than interfaces having received the multicast packet among interfaces linked up are selected for the protection line.

11. A route confirmation device comprising:
first means receiving a notification of starting a protection route communication confirmation or quality confirmation from a manager device including a destination network address and a confirmation identifier indicating a type of confirmation and storing the destination network address and the confirmation identifier instructed by the notification,
second means mirroring a received unicast packet addressed to the destination network address instructed by the notification and setting the confirmation identifier instructed by the notification in a predetermined area within a header of the packet obtained by the mirroring to be transferred to a preselected protection route when the received unicast packet addressed to the destination network address instructed by the notification does not include the confirmation identifier instructed by the notification, and
third means notifying the manager device of a result of the communication confirmation or quality confirmation and transferring the received unicast packet to the protection route when the received unicast packet is addressed to the destination network address instructed by the notification and includes the confirmation identifier instructed by the notification.

12. The route confirmation device as claimed in claim 11, further comprising:
means preliminarily receiving a threshold value of a line quality, and
means notifying the manager device of an alarm when a line quality of the received unicast packet falls below the threshold value upon receiving the unicast packet.

13. The route confirmation device as claimed in claim 11, further comprising means notifying the manager device of a failure of the communication confirmation upon detecting a fault of the protection line.

14. The route confirmation device as claimed in claim 11, wherein all interfaces registered in a prepared secondary routing table are selected for the protection line.

15. The route confirmation device as claimed in claim 11, wherein an interface for a route with a top priority among all interfaces registered in a prepared secondary routing table is selected for the protection line.

16. The route confirmation device as claimed in claim 11, wherein all interfaces other than interfaces having received the unicast packet among interfaces linked up are selected for the protection line.

17. A route confirmation device comprising:
first means receiving a notification of starting a protection route multicast communication confirmation from a manager device including a multicast address and a communication confirmation identifier and storing the multicast address and the communication confirmation identifier instructed by the notification,
second means mirroring a received multicast packet addressed to the multicast address instructed by the notification and setting the communication confirmation identifier instructed by the notification in a predetermined area within a header of the packet obtained by the mirroring to be transferred to a preselected protection route when the received multicast packet addressed to the multicast address instructed by the notification does not include the communication confirmation identifier instructed by the notification, and
third means notifying the manager device of a result of the multicast communication confirmation and transferring the received multicast packet to the protection route when the received multicast packet is addressed to the multicast address instructed by the notification and includes the communication confirmation identifier instructed by the notification.

18. The route confirmation device as claimed in claim 17, wherein all interfaces registered in a prepared secondary routing table are selected for the protection line.

19. The route confirmation device as claimed in claim 17, wherein an interface for a route with a top priority among all interfaces registered in a prepared secondary routing table is selected for the protection line.

20. The route confirmation device as claimed in claim 17, wherein all interfaces other than interfaces having received the multicast packet among interfaces linked up are selected for the protection line.

* * * * *